March 15, 1938.  H. H. LAMAR  2,111,430
PRESSURE RELIEF VALVE
Filed April 27, 1936
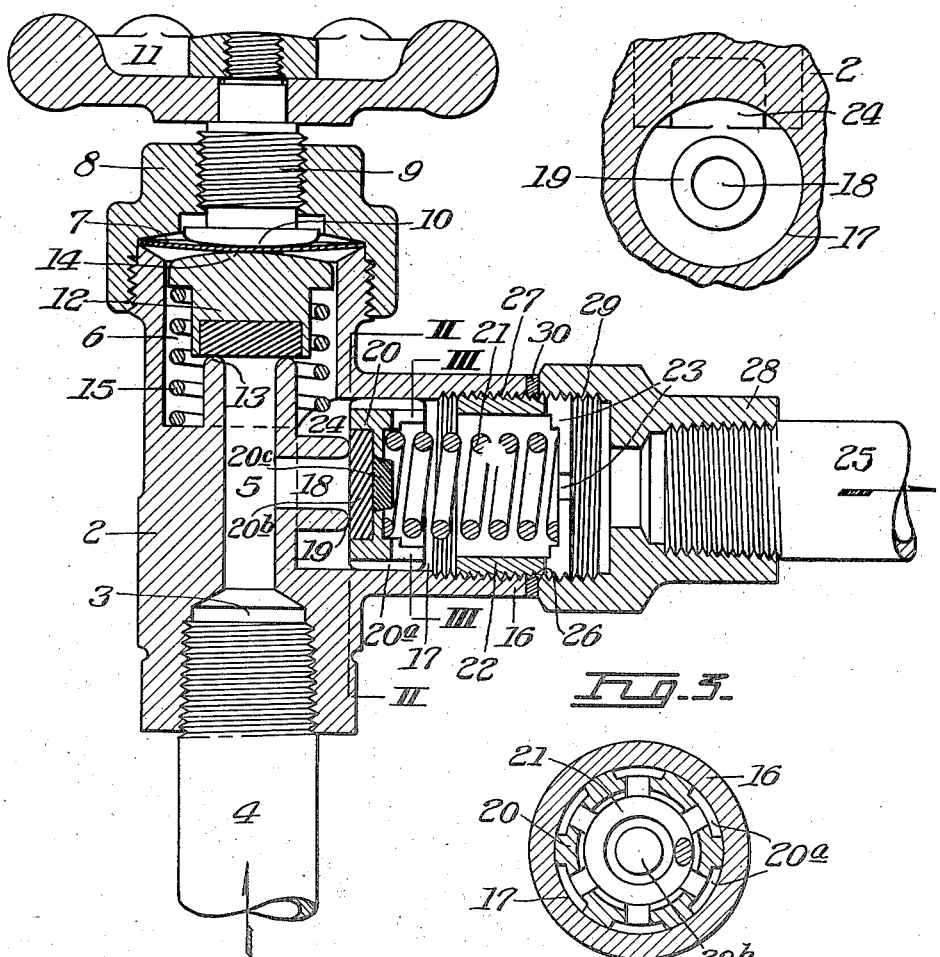
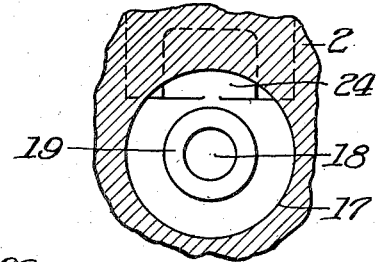
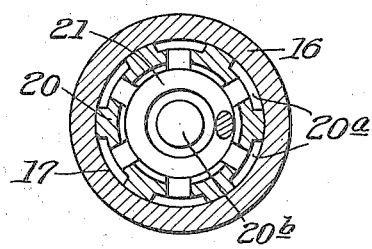
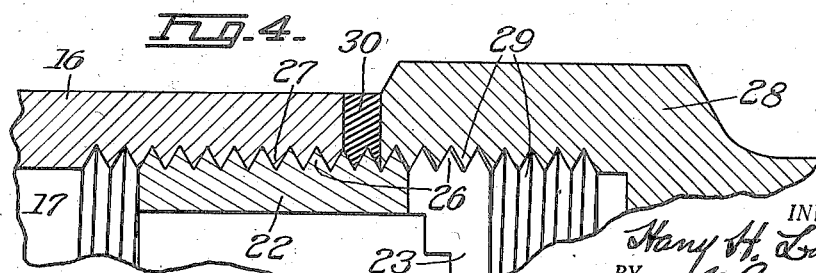
INVENTOR.
Harry H. Lamar
BY
ATTORNEY.

Patented Mar. 15, 1938

2,111,430

UNITED STATES PATENT OFFICE 2,111,430

PRESSURE RELIEF VALVE

Harry H. Lamar, Wilkinsburg, Pa., assignor to Kerotest Manufacturing Company, Pittsburgh, Pa., a corporation of Pennsylvania Application April 27, 1936, Serial No. 76,543

5 Claims. (Cl. 277—60)

This invention relates to improvements in valves, and more particularly to combined automatic pressure relief and manually operable blow-off valves.

In order to prevent the hazards which may be caused by fire or explosion in refrigeration systems employing gaseous refrigerants, safety means are necessary for relieving undesirable pressures. Heretofore, separate automatic and manually operable valves have been employed for this purpose; these independent valves however, involve unnecessary expense and in addition difficulties have been experienced, due to inexperienced operators tampering with the structure, in maintaining the automatic pressure relief devices at the desired relief settings.

My invention contemplates a unitary combined automatic pressure and temperature relief and manual blow-off valve structure of a character adapted to be readily inserted in, for example, a refrigeration system, and embodying a common fluid inlet passage and a common fluid discharge passage controlled by both the automatically operable valve and the manually operable valve to effect pressure relief.

I further have in view the disposition of the automatic pressure relief means in the line of flow through the valve, with associated adjusting means securely locked and permanently sealed against tampering upon connection of the valve in the system.

Additional objects and advantages will become apparent from the following description taken in connection with the accompanying drawing, wherein:

Fig. 1 is a longitudinal sectional view of a unitary combined automatic pressure relief and manually operated blow-off valve embodying my invention;

Fig. 2, a detail cross-section thereof taken on the line II—II of Fig. 1;

Fig. 3, a detail cross-section taken on the line III—III of Fig. 1; and

Fig. 4, an enlarged fragmentary sectional view of a portion of Fig. 1, particularly illustrating the locking and sealing means for the automatic relief valve adjusting means.

Referring to the drawing, 2 designates a valve body having an inlet 3 for connection with a suitable conduit 4, as by threads or a soldered connection. 5 designates a central fluid chamber in the body.

The upper end of the body is formed with an enlarged chamber 6 communicating with the chamber 5, said chamber being closed at its upper end by a flexible diaphragm 7, the latter being secured to the body by a screw-threaded or bolted cap or bonnet 8, which bonnet engages the peripheral edge of the diaphragm. 9 indicates an operating stem threaded in the bonnet and having an inner rounded terminal 10 for centrally contacting the upper side of the diaphragm; a suitable handwheel 11 is secured to the outer projecting end of the stem 9 for rotation of the latter.

A movable valve 12 for controlling the flow of fluid from chamber 5 to the chamber 6 is positioned in the chamber 6 between the diaphragm and a valve seat 13 surrounding the fluid chamber 5, this valve has a rounded upper terminal 14 for centrally contacting the under side of the diaphragm 7. A spring 15 engages and normally urges the valve against the diaphragm.

Located centrally of the body 2 is a laterally extending hollow body portion or nozzle 16 forming an outlet passage 17 for the valve structure, said outlet passage communicates with the body chamber 5 through an intervening lateral port or passage 18. 19 designates a valve seat between the passages 17 and 18.

A spring pressed relief valve 20 is slidably mounted in the outlet passage 17 and coacts with a spring 21 for normally seating the valve on its seat 19. This spring bears at its outer end in a cylindrical plug 22, the latter being screw threaded into the internal threaded portion of nozzle 16. The end wall of the plug against which the spring bears, is slotted at 23 for the discharge of fluid therethrough. The outer annular surface of the valve 20 is longitudinally fluted or slotted providing fluid channels or passages 20a.

In machining the valve body, the cutting or drilling operations followed for forming the chamber 6 and outlet passage 17 also form a communicating port 24 therebetween, said port extending transversely of the lower portion of the chamber 6 and the upper portion of the inlet passage 17. As shown in Fig. 2, this port 24 is of segmental cross-section and has an area slightly greater than the cross-sectional area of the flow chamber 5 and passage 18, thereby providing undiminished flow through the said port.

When in operation, the manually operable blow-off valve 12 is normally closed on its seat 13 by the stem 9 and handwheel 11, and the pressure in the system to which the valve structure is connected by means of the conduit 4 is directly applied to the automatically operable pressure relief valve 20.

The threaded plug 22 may be adjusted to impart the desired compression to the spring 21 so that the valve 20 will open automatically when the pressure in the system reaches the predetermined amount. The fluid so relieved will pass through the passages 18, 20a, 17 and discharge through the openings 23 in the adjustable plug 22, from whence the fluid may be conveyed to the atmosphere by a suitable pipe 25.

In the event that it is desired to manually relieve the pressure in the system to which the valve device is connected, the blow-off valve 12 may be opened by its handwheel 11 and stem 9 to discharge fluid from chamber 5 into chamber 6, from which latter chamber the fluid by-passes the automatic relief valve 20 and its seat 19 through the port 24 and into the outlet passage 17, passing around the valve 20 through passages 20a for discharge into pipe 25 as before.

During either mode of operation, it will be seen that the discharge of fluid is effected through a common outlet, thereby providing a compact unitary structure which may be economically manufactured. The diaphragm 7 acts as a packless seal to prevent the escape of fluid under any and all conditions of operation of my valve device.

Likewise, the automatic pressure relief valve is located in said discharge outlet for simplicity and economy. This latter feature of my invention also makes it possible for me to provide an improved adjustment for such valve securely locked and permanently sealed when the valve structure is assembled in the system.

For this purpose, the spring adjusting plug 22 projects beyond the terminal end of the lateral body portion 16 and is externally threaded throughout its length, as indicated at 26. The wall of the outlet passage 17 or the nozzle 16 is threaded at 27 to receive the threads of the plug. A reducing connecting member or nipple 28 is also internally threaded at 29 for connection with the projecting portion of the threaded plug 22, said nipple 28 being threaded at its other end for connection with the discharge pipe 25. 30 designates a gasket interposed between the ends of the body extension or nozzle 16 and the nipple 28 for sealing connection therebetween.

When the herein described valve devices are assembled in the factory, they are tested with the automatic relief valve 20, spring 21 and adjustable plug 22 in place, and the spring 21 is adjusted by means of said plug for automatic valve opening at the desired pressure. In order to maintain accurate settings of the spring by its plug 22, I prefer to provide a tight fit between the threads 26 of the plug and the threads 27 of the wall of the outlet passage 17, as indicated in Fig. 4.

Upon obtaining the proper spring setting for the desired relief pressure, the gasket 30 and nipple 28 are applied to the projecting end of the plug 22, and the nipple is screwed up to compress said gasket against the end of the nozzle 16. In this connection, I prefer to provide a suitable play or looseness between the threads 29 of the nipple and threads 26 of the plug 22, as shown in Fig. 4. The play in these threads permits the application of the nipple 28 to the previously adjusted plug 22 without disturbing the adjustment thereof, and upon said nipple being tightened against the gasket 30, the resultant force will frictionally secure the nipple by its threads to act as a lock nut for maintaining the relief valve spring adjustment.

The valve device is then stamped or marked with the automatic relief pressure and the nipple 28 soldered or sealed in place, whereby it will be seen that the complete unitary valve structure may be connected in the system, and is secure against tampering because of the manner of enclosure of the adjusting means.

It will be noted from the foregoing description that the adjusting, locking and sealing are accomplished with a minimum number of parts and operations.

The valves 12 and 20 may be provided with seating inserts of rubber or other resilient material for engaging their respective seats, the inserted member of the valve 20 being indicated at 20b.

Under extreme conditions of operations, as where the valve structure is subjected to severe heat, the insert 20b may melt and flow about the valve 20 with resulting clogging or stoppage of the passages 20a, whereby the automatic relief of fluid cannot take place upon opening of the said valve 20.

As an added safety feature, I therefore provide the valve 20 with a fusible metal plug 20c disposed centrally of the valve and normally closing a through opening in the rear of the said resilient insert 20b. Hence, if the valve structure is subjected to a temperature causing the insert 20b to melt, the fusible metal plug 20c will likewise melt to immediately relieve the fluid to the atmosphere through the said central opening of the valve.

From the foregoing it will be seen that I have provided an absolutely positive relief valve which is effective under all conditions of temperature and pressure to safeguard the system to which it is applied.

I claim:

1. In a pressure relief valve structure, a body having a fluid passage therein and a valve seat associated therewith, an automatically operable valve adapted to coact with the seat, a spring for normally seating the valve, said valve having fluid passages therethrough and having a resilient member for contacting said seat and closing the opening surrounded thereby, said valve also having a through opening normally closed by said resilient member, and a fusible plug mounted in said opening, as and for the purpose described.

2. The combination with a fluid inlet pipe and a fluid outlet pipe of a line, of a unitary valve structure interposed between said pipes and connected thereto including a casing formed with fluid inlet and outlet passages and valve seats, a manually operable valve and an automatically operable valve within the casing for separately relieving pressure in the inlet pipe, operating means for the automatic valve, said automatic valve and said means located in the outlet passage, and associated sealing and locking means disposed between the outlet pipe and the outlet passage whereby access to the automatic valve is prevented without disconnecting the outlet pipe.

3. A valve structure of the character described comprising a unitary casing including a body proper and a laterally projecting nozzle, said body having its interior formed with a central chamber and a valve chamber at an end of the central chamber, a manually operable valve in said valve chamber controlling flow between the said chambers, a passage effecting communication between the valve chamber and the nozzle, an automatically operable valve located in the nozzle, a spring acting on the valve, means in the nozzle for varying the spring tension, and locking and sealing means including a nipple associated with the nozzle whereby access to the automatic valve is prevented without disconnecting the nipple.

4. A valve structure of the character described comprising a unitary casing having a laterally projecting nozzle, said casing having its interior formed with a central chamber, an automatically operable valve in the nozzle, a spring acting on the valve, a plug for adjusting the tension of the spring having tight threaded engagement with the nozzle, said plug having a threaded portion projecting beyond the nozzle, a locking nipple having initially relatively loose threaded engagement with the plug whereby it may be applied to the plug without disturbing the spring adjustment, a sealing member interposed between an end of the nozzle and an end of the nipple and abutting with an end of the nipple to cause the loose threaded engagement between the plug and the nipple to become a tight threaded engagement.

5. In a pressure relief valve structure, a body having a fluid passage therein, an automatically operable valve for controlling said passage, a spring acting on the valve, means for adjusting the compression of the spring having tight threaded engagement with the body, and having a threaded portion thereof projecting beyond the body, a locking member having relatively loose threaded engagement with the projecting portion of said means, whereby the locking member may be applied to said projecting portion of the adjusting means without disturbing the spring adjustment, a sealing member between the inner end of the locking member and body engaging the locking member and causing the loose threads of the latter to react to effect a tight threaded engagement with the adjusting means.

HARRY H. LAMAR.